Feb. 25, 1941.    J. C. BAKER    2,233,372
METHOD FOR TESTING DOUGH
Filed May 21, 1938    2 Sheets-Sheet 1
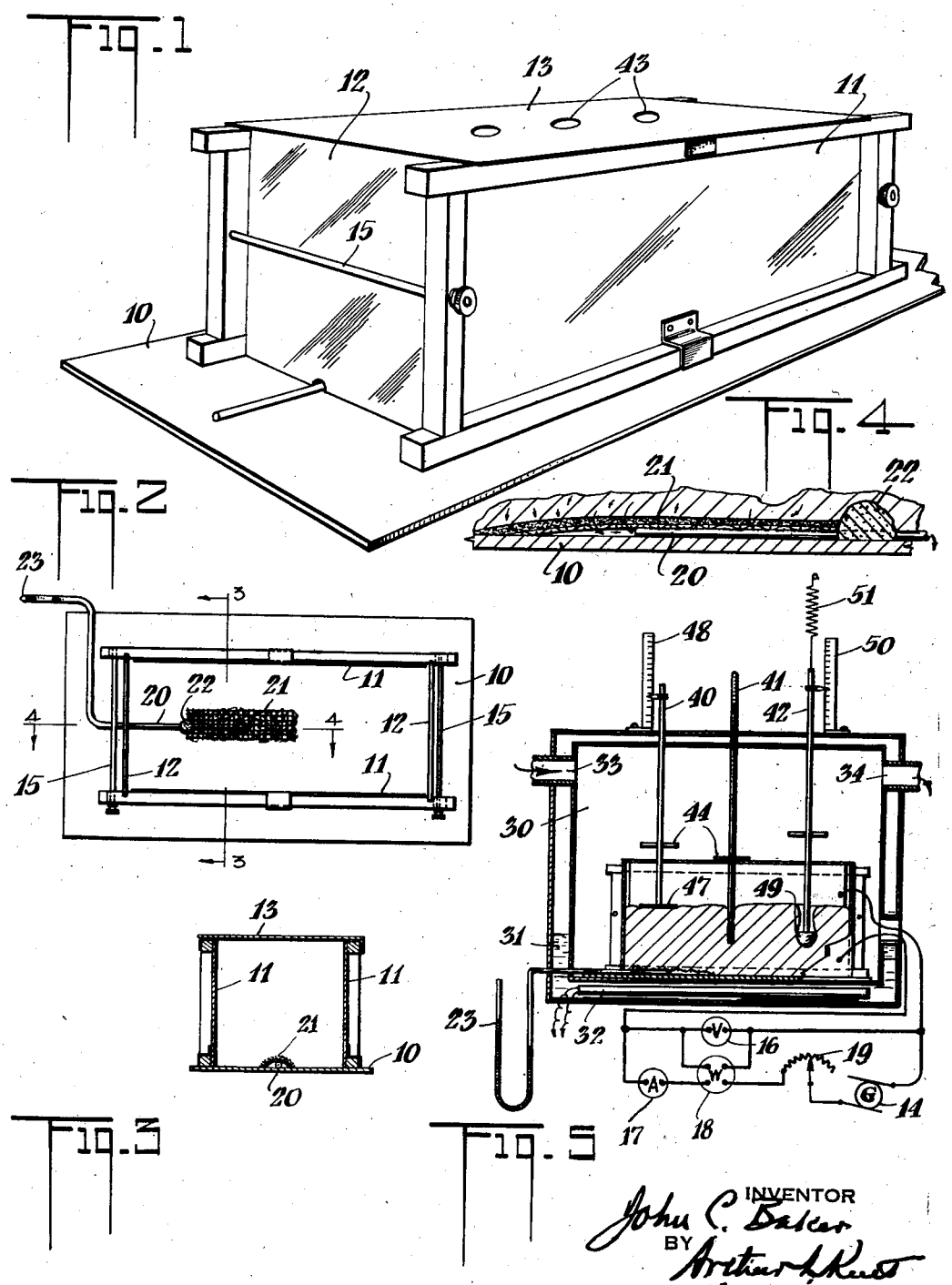
INVENTOR
John C. Baker
BY
Arthur L. Kent
his ATTORNEY

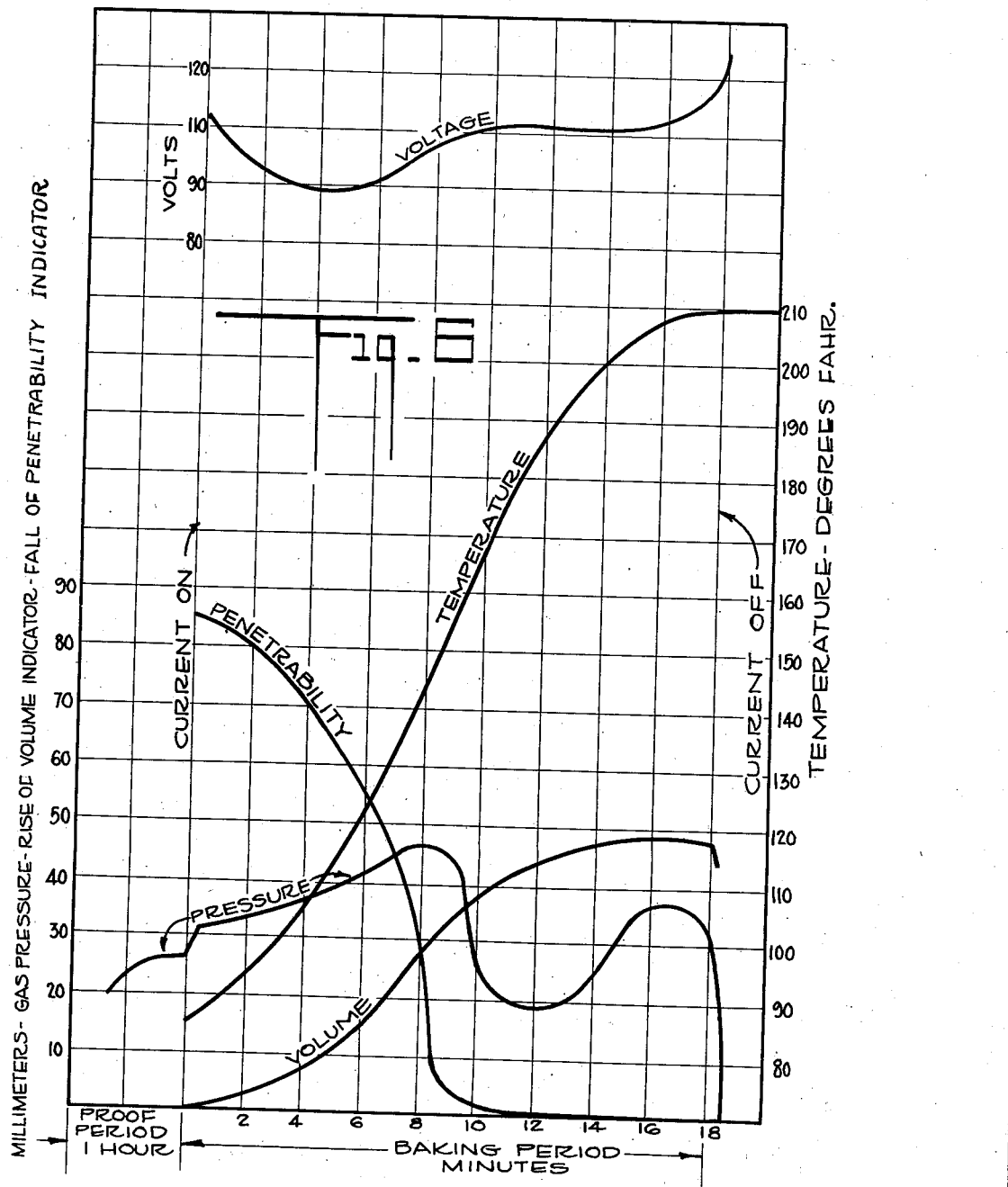

Patented Feb. 25, 1941

2,233,372

UNITED STATES PATENT OFFICE 2,233,372

METHOD FOR TESTING DOUGH

John C. Baker, Montclair, N. J., assignor to Wallace & Tiernan Products, Inc., Belleville, N. J., a corporation of New Jersey Application May 21, 1938, Serial No. 209,339

11 Claims. (Cl. 73—51)

This invention relates to a method for testing dough in order to determine the characteristics of the dough with regard to its baking qualities, etc.

The invention comprises a method wherein a mass of the dough to be tested is heated uniformly throughout by passing electric current through the dough, and the physical changes in the dough mass are measured as the baking proceeds. By heating the dough mass to a temperature near the boiling point of water, and during such heating measuring the gas pressure within the mass, the increase in volume of the mass, the penetrability of the dough, and the temperature within the mass, valuable information as to the characteristics or properties of the dough may be obtained. The rate of heat supply, to produce a suitable desired rate of heating, should most desirably be uniform, as by keeping the wattage constant by varying the applied voltage as the resistance to the flow of current through the dough mass varies. Measurement of changes in the electrical conductivity of the dough, as indicated by such varying voltage or by the varying amperage, affords, by itself and also in combination with other changes measured, valuable information as to the characteristics of the dough. Instead of maintaining the rate of heat supply uniform, the rate of heat supply may be such as to maintain a constant or other desired rate of heating.

The baking of bread involves a number of changes, some more or less chemical in character, such as the swelling of starch and the coagulation of proteins, and others chiefly physical, such as the driving off of the carbon dioxide in solution in the moisture of the bread and the evaporation or boiling off of the alcohol in the fermented dough, together with a certain amount of water.

Heretofore it has been customary to test the dough before baking and/or the bread after it has been made. By measuring the changes which occur during baking the various factors involved in producing the final result can be separated. Thus, the swelling or gelling of the starch grains occurs largely in one part of the baking period and the coagulation of the gluten and other proteins in another part. Examination of the final loaf gives only the final result of these changes, not the individual components going up to make the final result.

Testing the dough during baking has not been practiced in view of the fact that, with the ordinary methods of baking, the heating of the various parts of the dough has been uneven and the formation of a crust affects readings of pressure and volume changes to such an extent that they are of little value as indications of the changes in the conditions inside the loaf.

According to the present invention the dough is heated internally, instead of externally. This is done most desirably by passing electric current through the dough, by connecting to plates, one on each of opposite sides of the dough mass, to a suitable source of electrical energy, but may also be done by inducing currents in the dough in well-known manner. If the dough is heated internally by causing electric current to pass therethrough, not only is no crust formed, but also the dough is heated substantially uniformly. The current within the dough mass is most desirably maintained at a constant wattage by varying the applied voltage as the conductivity of the dough varies, thereby to maintain a constant rate of heat supply. The current is kept on until the temperature of the dough has risen to approximately 212° F., and is then immediately shut off. The wattage should be such that the dough is heated to approximately 212° F. in less than the usual baking time, and I have used for testing bread dough, and found entirely suitable, a wattage which effects the required heating in from 16 to 20 minutes. The wattage and resulting baking time may, however, be varied within a quite wide range, which will, of course, vary according to the kind of dough being tested, most cake doughs requiring a shorter time of heating than bread dough.

As the dough becomes heated it increases in volume, rising in the pan, the increase in height of the loaf continuing to a maximum usually followed by a slight decrease shortly before the current is shut off, and there always being a slight decrease immediately after the current is shut off. The increase in volume of the dough is caused by the development of gas pressure within the dough mass. Bread dough has considerable elastic extensibility and is capable of a certain amount of plastic flow. As carbon dioxide gas is developed in the dough as it is heated, the gas bubbles expand the mass. Expansion is opposed by the elasticity of the bubble envelopes but the ability of the dough to flow slowly under a steady pressure permits the bubbles to expand without undue rise in internal pressure. When, however, the starch grains swell (between 125 and 150° F. or thereabouts), these characteristics change very markedly. The dough loses much elastic extensibility and possesses to a lesser degree the property of plastic flow. As a result, the volume changes little thereafter. The loaf has to all intents and purposes become set, so far as physical form is concerned.

The gas pressure at any point in the dough is caused in part by the weight of the column of dough over the point at which the pressure is measured and in part by the resistance of the bubble envelopes to expansion. This resistance may in turn be divided into two parts, first that due to the elastic extensibility (rubber balloon action) and in part to the resistance of the dough to plastic flow. If the gas is evolved slowly the resistance to plastic flow is the chief factor. If the gas is evolved rapidly the elastic extensibility becomes a much more important factor. When the bubble envelopes break and coalescence takes place the total envelope area is decreased with a diminution of the resistance to gas expansion due to elastic extensibility with consequent drop in gas pressure. This coalescence may occur with loss of elastic extensibility and power to flow resultant upon the swelling of the starch, the coagulation of the protein, or other cause. The changes in gas pressure, volume and penetrability, for a given rate of heat supply, vary according to, and all depend on and afford indications of, characteristics of the dough.

With the input of electricity regulated to a constant wattage, the rate of temperature rise of the dough is slower during the first part of the heating and during the latter part of the heating than during the intermediate stage, the rise during the intermediate stage being fairly steady. The rates and variations of temperature rise vary somewhat for different doughs, and the temperature changes during the heating of the dough may thus be a further source of information as to characteristics of the dough.

The penetrability of the dough, which varies as the heating progresses and which may be determined by means of a simple instrument hereinafter explained, shows, most importantly, the stiffness of the dough at the start and the changes in stiffness, and especially the rate at which the dough stiffens as the result of the swelling of the starch.

Valuable information may be deduced from changes in electrical conductivity of the dough during the baking, obtained from variations in the applied voltage required to maintain a constant wattage in the dough, or to maintain a constant or other desired rate of heating, that is, a predetermined temperature gradient. The conductivity of the dough depends on the amount of water and salt in the dough and also on other characteristics, such as the degree of oxidation of the dough. During the first part of the heating of the dough the conductivity increases, as shown by a decrease in the impressed voltage required to keep the wattage constant. The changes in conductivity may also be obtained from the variations in amperage of the current.

Starch swelling occurs between 125 and 150° F. or thereabouts and as that proceeds the electrical resistance of the dough increases more rapidly than conductivity increases due to rise in temperature. As a result the voltage must be increased to keep the wattage constant. Protein coagulation occurs in bread baking largely between about 185 and 212° F. and that change again increases the resistance of the dough.

There are thus five physical changes which take place in the dough during the baking, that is, during the heating of the dough up to approximately 212° F., and which may be measured as the baking progresses, namely, changes in temperature, changes in pressure, changes in volume, changes in penetrability, and changes in electrical conductivity determined from adjustments in the applied voltage required to keep the wattage constant or to maintain a desired temperature gradient or from variations in amperage. These changes all depend on, and are indications of, characteristics, properties or conditions of the dough; and it is by the measurement and observation of the rate, time and amount of these changes, or of one or more of them, that the dough is tested according to the present invention.

Simultaneous determinations of temperature, pressure, volume, penetrability and electrical conductivity enable a much better evaluation to be made of the various factors, such as those involved in bubble formation and coalescence, cell collapse and texture shrinkage, degree of oxidation and alcohol content, on which the final structure and character of baked dough depend, than can be made from measurements of any one of these factors or from less than all of them.

The measurements can be plotted against time. If the temperature rise is maintained at approximately the same rate for a series of doughs tested, changes other than temperature may be plotted against temperature; but when the wattage is held constant, as is most desirable, as stated, the temperature curves in nearly all cases are very similar, so that plotting against time is in general satisfactory.

An approved form of apparatus suitable for carrying out the method, and intended especially for testing bread dough, is shown, by way of example, in the accompanying drawings, in which:

Fig. 1 is a perspective view of the bread pan;

Fig. 2 is a plan view on a smaller scale of the pan with the cover removed;

Fig. 3 is a sectional view taken on line 3—3 of Fig. 2;

Fig. 4 is an enlarged detail section on line 4—4 of Fig. 2;

Fig. 5 is a longitudinal vertical sectional and somewhat diagrammatic view of the complete testing apparatus; and Fig. 6 shows a typical graph or chart prepared from readings of the apparatus shown in Figs. 1 to 5.

The pan comprises a bottom wall 10, side walls 11, end walls 12 and a removable top wall or lid 13. The side walls are of metal or at least have an inner facing of metal so that they can act as electrodes for the passage of alternating current through the dough from a suitable source 14. The bottom 10, end walls 12 and top 13 are of glass or other non-conducting material, so that there will be no passage of current between the electrodes except that through the dough. The four walls are held together by tie-rods 15 or by any other suitable means. A voltmeter 16, an ammeter 17, a wattmeter 18, and a rheostat 19 for controlling the applied voltage are connected in the circuit between the electrodes and the source 14 of electrical energy.

For measuring the gas pressure generated during baking, a tube 20 is provided which extends into the pan and has its open end positioned at the bottom of the pan near its middle, as shown in Fig. 2. This tube end is covered by a layer 21 of porous non-conducting material, such as glass wool. Sand might also be used. One purpose of this layer is to keep the dough from clogging the open end of the tube and to enable gas to flow to the open end of the tube from a considerable area of the undersurface of the dough. Another purpose will be explained later. When, as shown, the tube 20 extends along the bottom of the pan and out through the wall, a lump 22 of suitable material, preferably unleavened dough, is molded around it to prevent gas escape along the outside of the tube. The outer end of the tube 20 beyond the pan is bent to form, or connected to, a U-tube 23 to serve, when filled with oil, as a manometer.

The pan is enclosed in a chamber 30 for the purpose of supplying external heat to the pan to prevent undue differences in temperature between the exterior portions of the dough and the interior of the dough mass and particularly to prevent condensation of water vapor on the pan bottom 10. It also serves to prevent condensation on the electrodes 11. This is an important precaution in the measurement of pressure. It does not vitally affect the other measurements. One wall of the chamber is either hingedly attached or made detachable to permit the pan to be inserted and removed.

The bottom and side walls of the chamber 30 are made hollow to serve as a water-jacket 31, the water in which is heated by suitable means, such as an electric resistance element 32. The bottom wall 10 of the pan rests on the water-containing bottom of the chamber and receives heat by direct conduction therefrom. The bottom wall 10 is desirably made of suitably thin material so that heat from the bottom of the chamber may penetrate it more rapidly than internal heat is generated in the dough by the passage of the electric current therethrough. The purpose of this rapid heating of the dough in contact with the bottom wall 10 is to "set" it before the main mass of dough sets and thereby prevent escape of gas along the surface of the bottom wall. The layer of glass wool over the open end of the tube 20, being a good non-conductor of heat, serves to prevent the dough over such layer setting prematurely by which the reading of the gas pressure in the dough mass might be affected.

As a further means for warming the sides 11, ends 12 and top 13 of the pan, warm moist air or steam, most desirably moist air, is supplied through an inlet 33 in one end of the chamber and discharged through an outlet 34 in the opposite end. The air should be moist to prevent the top surface of the dough drying out. As a further precaution against drying out of the top surface of the dough, the latter may be sprayed with a solution of salt and glycerine.

Through the top of the chamber slidably extend three instruments, a volume indicator 40, a thermometer 41 and a penetrability indicator 42. These instruments extend downward through holes 43 in the top wall 13 of the pan, which holes are large enough to permit the instruments to move freely vertically therein. Each instrument has a collar 44, or the like, adapted to contact with the top wall when the latter is lifted off the pan so that by raising the top wall the lower ends of all three instruments can be raised high enough to clear the pan to permit the pan to be placed in position or removed.

The volume indicator has a flat disk 47 at its bottom which rests on the top of the dough. The weight of the indicator is made small and the area of the disk relatively large, so that the indicator offers substantially no resistance to the upward movement of the dough due to the generation of gas therein and is moved up by the rising dough to give a true indication as the dough rises or falls. To the top of the indicator is attached a pointer which extends over a scale 48 mounted on the top of the chamber.

The penetrability indicator has a bulb 49 at its lower end and is of suitable weight so that, when resting on the dough, it will sink slowly down through it. A pointer at the upper end of the indicator extending over a scale 50 enables the downward movement of the indicator to be measured. To enable a measure of penetrability throughout the entire baking period to be obtained on doughs from different flours of widely different properties, a spring 51 of suitable strength may be connected to the top of the indicator. This spring offers increasing resistance to downward movement of the indicator, so that, for equal penetrability, the first increments of movement through the dough will take much shorter intervals of time than the last. If the spring is of such length and strength that, when the bulb 49 is a little above the top of the dough mass at the commencement of baking, it is under no tension, and, before the bulb touches the bottom 10 of the pan, the tension of the spring equals the entire weight of the penetrability indicator, it follows that the indicator will be operative with all kinds of dough and for all periods of baking. The force pressing the indicator downward for any position thereof can be calculated.

Simultaneous measurements of increase in volume and of penetrability are desirable, since the rate of movement of the penetrability indicator with respect to the dough can be known accurately only if the rate at which the dough is moving upward is also known. The readings on the scale 51 give the rate of movement of the indicator relatively to the pan and not to the dough.

The penetrability indicator is located at some distance from the layer 21 of glass wool, so that the puncturing of the dough by the indicator will not permit gas to escape from the dough around the glass wool and so affect the pressure readings.

Fig. 6 is a diagrammatic showing of a graph obtained from measurements made in testing bread dough with the apparatus above described. In view of the explanation of the changes occurring during baking and of the description of the apparatus given above, it is believed that except for the penetrability curve the graph is self-explanatory. The penetrability curve is the inverse of the actual figures for the fall of the indicator. Thus, if the reading on scale 50 at the start of the baking period is 5 mm. and the corrected reading at the end is 53 mm., all the readings after correction are subtracted from 53 and the result plotted. The curve will then show a drop from 48 to 0 during the course of the baking.

What is claimed is:

1. The method of testing dough, which comprises heating a mass of dough to baking temperature by supplying heat throughout the interior of the mass, and measuring one or more physical changes in the dough as the baking proceeds, such as changes in gas pressure, in volume, in penetrability, in temperature, and in electrical conductivity.

2. The method of testing dough, which comprises heating a mass of dough to baking temperature by causing electric current to flow therein, and measuring a physical change in the dough as the baking proceeds.

3. The method of testing dough, which comprises heating a mass of dough to baking temperature by causing electric current to flow therein between two electrodes, varying the applied voltage to control the heating, and measuring one or more physical changes in the dough as the baking proceeds.

4. The method of testing dough, which comprises heating a mass of dough to baking temperature by supplying heat throughout the interior of the mass, and measuring the changes in gas pressure within the dough mass as the baking proceeds.

5. The method of testing dough, which comprises heating a mass of dough to baking temperature by supplying heat throughout the interior of the mass, and measuring the changes in the volume of the dough mass as the baking proceeds.

6. The method of testing dough, which comprises heating a mass of dough to baking temperature by supplying heat throughout the interior of the mass, and measuring the changes in the penetrability of the dough as the baking proceeds.

7. The method of testing dough, which comprises heating a mass of dough to baking temperature by supplying heat throughout the interior of the mass, and measuring the changes in the gas pressure within the dough and in the volume of the dough mass and in the penetrability of the dough as the baking proceeds.

8. The method of testing dough, which comprises heating a mass of dough to baking temperature by supplying heat throughout the interior of the mass, maintaining the rate of heat supply constant, and measuring the changes in the temperature and in the gas pressure within the dough and in the volume of the dough mass and in the penetrability of the dough as the baking proceeds.

9. The method of testing dough, which comprises heating a mass of dough to baking temperature by supplying heat throughout the interior of the mass, maintaining the rate of heat supply constant, and measuring the changes in gas pressure within the dough as the baking proceeds.

10. The method of testing dough, which comprises heating a mass of dough by causing electric current to flow therein, controlling the applied voltage to maintain the wattage constant, and measuring the changes in the applied voltage and in the gas pressure within the dough as the baking proceeds.

11. The method of testing dough, which comprises placing a mass of dough confined within a rectangular container having vertical side walls, two of the side walls opposite each other being conductors of electricity and the other side walls and the bottom and top of the container being non-conductors, heating the dough to baking temperature by causing electric current to flow therein from one conducting wall to the other, controlling the applied voltage to maintain the wattage constant, and measuring the rise of the dough mass and the changes in gas pressure within the dough mass as the baking proceeds.

JOHN C. BAKER.